United States Patent Office 3,011,704
Patented Dec. 5, 1961

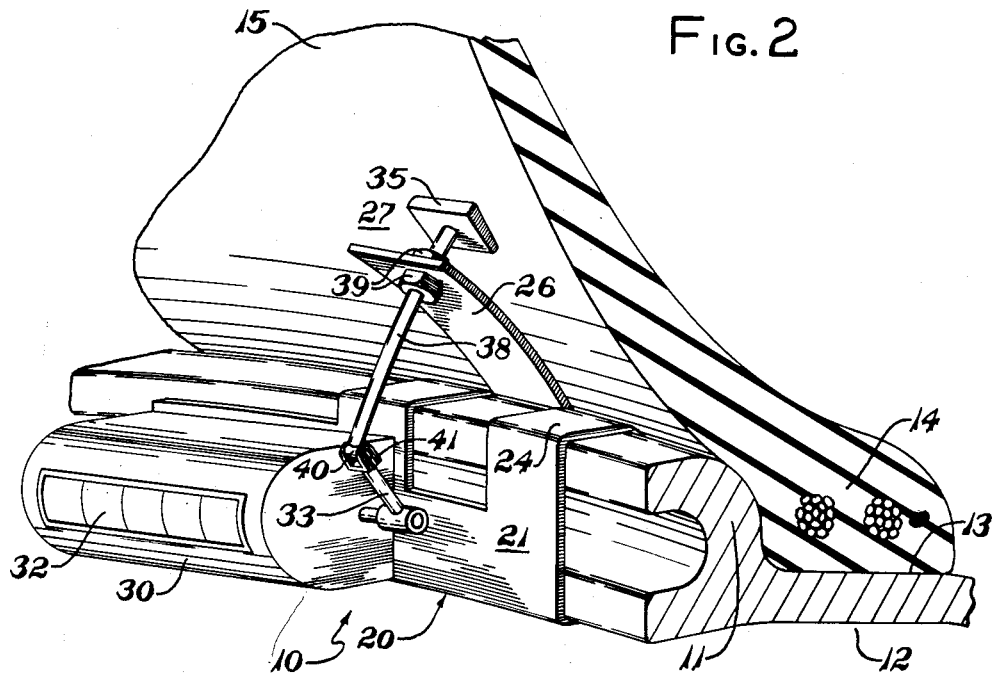

3,011,704
WHEEL ROTATION COUNTER
Kenneth R. Durst, Troy, Ohio, assignor to The B. F. Goodrich Company, New York, N.Y., a corporation of New York
Filed Aug. 1, 1958, Ser. No. 752,546
1 Claim. (Cl. 235—91)

This invention relates to an improved mode of counting revolutions of a wheel and tire assembly under a predetermined minimum load. The invention has particular utility in measuring the mileage service of aircraft wheels and tires.

Aircraft wheels are frequently rolled in service under widely variable radial loads. During a substantial portion of a landing or a take-off run, for example, the wheels may be rotating at very high speeds and in actual ground contact but with the major proportion of the aircraft weight sustained by aerodynamic lift, rather than carried on the wheels. Since service life and customer warranties covering such equipment are ordinarily based on the distance rolled by the wheel under a rated load, it is most desirable to have an actual or direct measure of this distance rather than rely on computations and estimates. Merely counting wheel revolutions independently of load is obviously a false measure of the service life of a wheel assembly.

The present invention advantageously provides a direct and accurate measure of the service life of a wheel and tire assembly under these circumstances. According to this invention, the counting impulse which provides the desired measurement is the cyclic displacement of a selected localized region of sidewall of the tire as its adjacent tread region moves in and out of the tire foot print. For this purpose any small region of the tire sidewall preferably near one bead may be selected. Under a given radial load this region will be displaced or bulged axially of the wheel and will return to its original position once for each revolution of the wheel. The extent of such deflection of the sidewall is, of course, proportional to the load imposed on the wheel, and where no appreciable load is imposed on the rolling wheel, there will be no counting impulse. As the load is transferred to the wheel, however, the ground-engaging area of the tread is flattened against the ground to from a "foot print." Hence, the selected local region is displaced once during each revolution of the wheel as this region passes through the "foot print."

The measuring mechanism of this invention embodies a deflection-sensing member which is supported on the wheel for cyclic displacement by the selected localized region of the tire. This sensing member may be conveniently carried by a bead flange on the wheel for rotation with the wheel. A suitable counter is also carried by the wheel and connected to the sensing member to register the number of times the sensing member is deflected. The counter element can be calibrated as desired to read the number of cycles of wheel rotation, tire mileage, or any corresponding quantity. Preferably, in the preferred embodiment, the sensing member is biased against the localized region of the tire sidewall so that the sensing member is maintained at all times against the selected local region of the tire bead.

A preferred design for a counting mechanism in accordance with this invention is shown in the accompanying drawing in which:

FIG. 1 is a fragmentary cross-sectional view through a bead flange and tire bead and showing the counting mechanism mounted on the bead flange; and FIG. 2 is a partial perspective view of the mechanism of FIG. 1.

The counting mechanism 10 is attached to the outside face of a bead flange 11 of a wheel rim 12. The inside face of the bead flange 11 and rim 12 define a bead seat 13 to receive one of the beads 14 of a conventional pneumatic tire mounted on the wheel, and including a flexible sidewall portion 15.

The counting mechanism 10 includes a mounting bracket 20 of generally C cross-sectional shape with a radial leg 21 across the outside face of the bead flange and with a lower inturned portion 22 which projects under the bead flange 11 and is secured to the bead flange by a mounting screw 23. An upper leg 24 of the mounting bracket extends over the top of the bead flange 11 and is clamped between the inside surface of the bead flange and the adjoining region of the bead portion 14. The inner edge of leg 24 is preferably feathered to fit snugly between the tire bead and the bead flange 11.

The mounting bracket 20 is preferably of thin spring steel and is quite short in its circumferential extent on wheel flange 11. The principal criterion for the design of bracket 20 is to give the counter mechanism a firm anchorage to the wheel flange, and hence the mounting bracket may have a variety of forms. The bracket may be conveniently stamped from sheet metal.

As shown in FIG. 2 the center region of the mounting bracket is cut away and deflected upwardly to form a flat spring arm 26, the upper end of which is opposite a selected local region 27 on the tire sidewall 15, the deflection of which is sensed to provide the counting impulse.

A counter 30 is secured by a bolt 31 to the radial flange 21 of the mounting bracket. The counter 30 may be an ordinary digital laboratory counter having an appropriate number of dials 32 to register the number of deflections of its crank arm 33 at the end of the counter. Preferably the counter 30 is of the type in which arm 33 must be swung through an arc of appreciable size to cause the counter to register. Counters including such "lost-motion" connections with its input mechanism are, of course, well known in the art.

Cyclical deflection of region 27 of the tire sidewall is sensed by a pressure foot 35 which is biased against the region 27 of the sidewall by the resiliency of spring arm 26. The pressure foot 35 preferably has its tire-engaging face contoured to fit flat against the region 27 of the tire which it engages. The pressure foot 35 is threaded onto the end of a rigid rod 38 which extends through an opening in the end of spring arm 26 and which in turn is fastened to arm 26 by a pair of lock nuts 39 on opposite sides of the spring. The opposite end of rod 38 is loosely and pivotally engaged at 40 to a clevis 41 on the outer end of the counter arm 33.

Each time the tread region (not shown) adjacent the sidewall portion 15 of the tire comes into ground engagement at the "foot print" region of the tire under a predetermined load and is thereby urged toward the rim of the wheel by the load sustained by the wheel, the tire sidewall portion 27 will be deflected outwardly and downwardly. That is to say, the cross section of the tire will be deformed from a somewhat circular shape in the regions opposite the foot print, to a generally elliptical or curved-end oblong shape at the tire foot print. Thus the area 27 of the tire engaged by the pressure foot 35 is deflected laterally downward in an arc generally about the upper inside edge of the bead flange 11, once for each revolution of the wheel. When the wheel is under sufficient load, this displacement of region 27 will effect a corresponding axial displacement of pressure foot 35 and rod 38 against spring 26 sufficient to depress the counter arm 33 until it registers. As soon as the sidewall 15 returns to its normal generally circular shape as the tread portion adjacent region 27 moves beyond the foot print, the spring 26 will cause the pressure foot 35 to follow the region 27 back to its normal position. Preferably the pressure foot 35 always remains in contact with the region 27 of the tire. The arm 38 is preferably curved slightly at about the radius of the path along which region 27 is deflected.

The particular elevation on the sidewall of the region 27 may be selected according to the load to which the tire is subjected. The circumferential location of the counter mechanism on flange 11 is immaterial. With this mechanism the counter 30 cannot register unless there is a load sufficient to produce an actual predetermined amount of lateral and radial displacement of the region 27 of the tire sidewall.

The counting mechanism is so small and light compared with the mass of the tire and rim assembly that it does not introduce a balancing problem. In any event, it is an easy matter to re-balance the wheel, if this is necessary.

Variations in the construction may be made within the scope of the following claim.

I claim:

Mechanism for measuring the service life of a wheel and tire assembly under a predetermined load comprising a mounting member engageable with a region of a bead flange of the wheel for rotation with the wheel, a spring member projecting from the mounting member to a location adjacent a selected localized region of the sidewall of a tire mounted on said wheel, a sensing member mounted on said spring and biased by said spring toward a position of engagement with said local region of the tire sidewall for sensing deflection of said local region, said spring supporting said member for displacement in response to cyclic deflection of said localized region of the tire sidewall caused by the engagement of the tire with the ground, a counter carried on said mounting bracket, and a rod extending from said sensing member to deflect said counter to register the frequency of deflections of said sensing member and spring as a measure of the service life of said assembly.

References Cited in the file of this patent

UNITED STATES PATENTS

| | | |
|---|---|---|
| 1,101,406 | Clise et al. | June 23, 1914 |
| 1,151,743 | Veeder | Aug. 31, 1915 |
| 1,238,205 | Shaw | Aug. 28, 1917 |
| 1,373,453 | Schroeder | Apr. 5, 1921 |
| 1,391,513 | Schroeder | Sept. 20, 1921 |
| 1,471,981 | Sargent | Oct. 23, 1923 |
| 1,505,782 | Hartsell | Aug. 19, 1924 |
| 1,506,947 | Schroeder | Sept. 2, 1924 |
| 1,768,048 | Galli | June 24, 1930 |
| 1,785,614 | Boyer | Dec. 16, 1930 |